(12) United States Patent
Yeh et al.

(10) Patent No.: US 12,384,865 B2
(45) Date of Patent: *Aug. 12, 2025

(54) CONTACT LENS MATERIAL AND CONTACT LENS

(71) Applicant: PEGAVISION CORPORATION, Taoyuan (TW)

(72) Inventors: Wei-An Yeh, Taoyuan (TW); Ting-Yu Li, Taoyuan (TW)

(73) Assignee: PEGAVISION CORPORATION, Taoyuan (TW)

(*) Notice: Subject to any disclaimer, the term of this patent is extended or adjusted under 35 U.S.C. 154(b) by 682 days.

This patent is subject to a terminal disclaimer.

(21) Appl. No.: 17/676,636

(22) Filed: Feb. 21, 2022

(65) Prior Publication Data

US 2022/0275129 A1 Sep. 1, 2022

Related U.S. Application Data

(60) Provisional application No. 63/152,503, filed on Feb. 23, 2021.

(51) Int. Cl.
C08F 226/10 (2006.01)
G02B 1/04 (2006.01)

(52) U.S. Cl.
CPC ............ C08F 226/10 (2013.01); G02B 1/043 (2013.01)

(58) Field of Classification Search
CPC .............................. C08F 226/10; G02B 1/043
See application file for complete search history.

(56) References Cited

U.S. PATENT DOCUMENTS

| | | | |
|---|---|---|---|
| 9,046,641 B2 | 6/2015 | Lai et al. | |
| 2010/0120939 A1 | 5/2010 | Phelan | |
| 2014/0213685 A1 | 7/2014 | Jan | |
| 2014/0221549 A1* | 8/2014 | Webster | C08G 77/458 525/450 |
| 2014/0371410 A1 | 12/2014 | Jan | |
| 2017/0329052 A1 | 11/2017 | Chan | |
| 2018/0037690 A1* | 2/2018 | Aitken | C08F 283/124 |
| 2019/0002415 A1 | 1/2019 | Mahadevan et al. | |
| 2019/0366659 A1* | 12/2019 | Breitkopf | B29D 11/00038 |
| 2020/0172647 A1 | 6/2020 | Lai et al. | |
| 2022/0227911 A1 | 7/2022 | Takashima et al. | |

FOREIGN PATENT DOCUMENTS

| | | | | |
|---|---|---|---|---|
| CN | 101516971 A | 8/2009 | | |
| CN | 102558458 A | 7/2012 | | |
| CN | 103224596 A | 7/2013 | | |
| CN | 103224597 A | 7/2013 | | |
| CN | 103848946 A | 6/2014 | | |
| CN | 105713153 A | 6/2016 | | |
| CN | 107365404 A | 11/2017 | | |
| CN | 111253533 A | 6/2020 | | |
| JP | 2016524178 A | 8/2016 | | |
| JP | 2017203155 A | 11/2017 | | |
| TW | 202104296 A | 2/2021 | | |
| WO | WO-03002635 A1 * | 1/2003 | | C08G 77/38 |
| WO | WO-2014177871 A1 * | 11/2014 | | B29C 35/00 |
| WO | WO-2016099555 A1 * | 6/2016 | | B01D 69/125 |
| WO | WO2020054711 A1 | 3/2020 | | |

OTHER PUBLICATIONS

WO 03002635 Machine Translation (Year: 2003).*
Hamid Javaherian Naghash and Mahda Ghandeharialavije, Synthesis and Characterization of a Nonionic Copolymeric Surfactant Based on a Monotelechelic Polydimethylsiloxane and Oxypropylated Acrylate Ester, Synthesis and Reactivity in Inorganic, Metal-Organic, and Nano-Metal Chemistry, vol. 44, p. 514-522 (Year: 2014).*

* cited by examiner

*Primary Examiner* — Mark Eashoo
*Assistant Examiner* — Caitlin Norine Illing
(74) *Attorney, Agent, or Firm* — Li & Cai Intellectual Property (USA) Office

(57) ABSTRACT

A contact lens material includes: a hydrophilic monomer, a crosslinking agent, an initiator, and a siloxane monomer. Based on a total weight of the contact lens material being 100 parts by weight, an amount of the siloxane monomer is between 5 parts by weight and 50 parts by weight. A chemical empirical formula of the siloxane monomer is: $C_aH_bO_cN_dSi_e$, in which C represents carbon atoms, a is a positive number between 12 and 55, H represents hydrogen atoms, b is a positive number between 29 and 121, O represents oxygen atoms, c is a positive number between 4 and 17, N represents nitrogen atoms, d is a positive number between 0 and 5, Si represents silicon atoms, and e is a positive number between 1 and 9.

8 Claims, No Drawings

CONTACT LENS MATERIAL AND CONTACT LENS

CROSS-REFERENCE TO RELATED PATENT APPLICATION

This application claims priority to the U.S. Provisional Patent Application Ser. No. 63/152,503 filed on Feb. 23, 2021, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a contact lens material, and more particularly to a contact lens material and a contact lens, which has characteristics of high oxygen permeability, high water content, and high surface hydrophilicity.

BACKGROUND OF THE DISCLOSURE

Hydrogel contact lenses are made of hydrogel materials, such as poly-2-hydroxyethyl methacrylate (p-HEMA). The strength of poly-2-hydroxyethyl methacrylate (p-HEMA) can be improved by adding crosslinking agent, such as ethylene glycol di-meth acrylate (EGDMA) to enable the polymer chains of hydrogel materials to be interlaced and bonded to each other.

The water content of poly-2-hydroxyethyl methacrylate (p-HEMA) is relatively low (only about 35-40%). In order to increase the water content, in addition to p-HEMA, more than one hydrophilic monomers, such as N-vinyl pyrrolidone (NVP), N,N-di(methyl acrylamide) (DMA), methacrylic acid (MAA), are added to the contact lens material to increase the water content of the contact lenses.

With the addition of the hydrophilic monomers, the water content of the contact lenses can be effectively increased up to 70-80%. However, the higher water content of the contact lenses, the lower tension and toughness thereof become. The water content of the contact lenses should be controlled moderately. The water content is generally between 45% and 60%. However, for daily disposable contact lenses, the required oxygen permeability (DK) needs to be between 40 and 70, but no matter how the water content of the hydrogel contact lenses is increased, the oxygen permeability can only reach between 15 and 35.

In contrast, silicone hydrogel contact lenses can effectively increase the oxygen permeability (DK). The silicone hydrogel contact lenses contain hydrophilic silicon-containing polymer materials and hydrophilic monomers, such as NVP, DMA, and MAA. These materials are co-polymerized to form the hydrogel contact lenses. However, the surface of the silicone hydrogel contact lenses has hydrophobic properties, which can easily lead to the growth of bacteria and cause problems such as eye inflammation. Therefore, the surface of the silicone hydrogel contact lenses usually needs to be modified to improve the wettability of the material surface.

Therefore, a novel silicone hydrogel material needs to be developed to solve the above-referenced technical inadequacies.

SUMMARY OF THE DISCLOSURE

In response to the above-referenced technical inadequacies, the present disclosure provides a contact lens material and a contact lens.

In one aspect, the present disclosure provides a contact lens material including: a hydrophilic monomer, a crosslinking agent, an initiator, and a siloxane monomer. Based on a total weight of the contact lens material being 100 parts by weight, an amount of the siloxane monomer is between 5 parts by weight and 50 parts by weight. A chemical empirical formula of the siloxane monomer is represented by formula (I):

$$C_aH_bO_cN_dSi_e.\qquad\qquad\text{formula(I)}.$$

C represents carbon atoms, and a is a positive number between 12 and 55. H represents hydrogen atoms, and b is a positive number between 29 and 121. O represents oxygen atoms, and c is a positive number between 4 and 17. N represents nitrogen atoms, and d is a positive number between 0 and 5. Si represents silicon atoms, and e is a positive number between 1 and 9.

In certain embodiments, a molecular weight of the siloxane monomer is between 400 and 1,200.

In certain embodiments, a main chain of a molecular structure of the siloxane monomer has siloxane repeating units or siloxy groups. The main chain further has a first hydrophilic segment composed of a 1-aminoglycerol structural fragment modified by a substituent represented by formula (I-a), and a branched chain of the molecular structure of the siloxane monomer further has a second hydrophilic segment composed of polyethylene glycol (PEG).

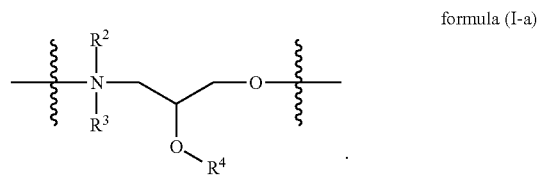

formula (I-a)

In certain embodiments, the molecular structure of the siloxane monomer further has a hydrophilic branch grafted onto the main chain. The hydrophilic branch has x carbon atoms and y oxygen atoms, in which $0 \leq x+y \leq 10$, and an end of the hydrophilic branch away from the main chain has a hydrophilic functional group, which is a hydroxyl functional group (—OH group) or an alkoxy functional group.

In certain embodiments, a chemical skeletal formula of the siloxane monomer is represented by formula (II-1) or formula (II-2):

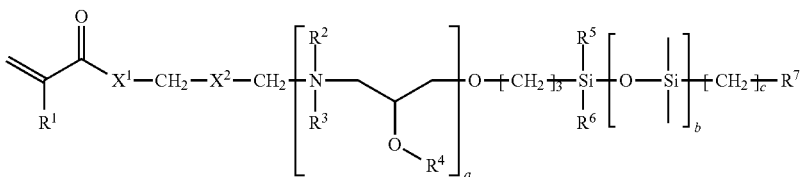

formula (II-1)

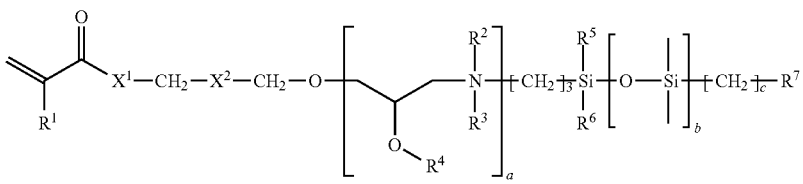

formula (II-2)

$R^1$ is H or methyl group (—CH$_3$); $X^1$ is O or NR$^8$; $X^2$ is CH—OR$^9$ or absent; $R^2$ is methyl group (—CH$_3$) or absent; $R^3$, $R^4$, $R^7$, $R^8$ and $R^9$ are independent of each other (i.e., the substituents may be the same or different) and each is H or methyl group (—CH$_3$) or

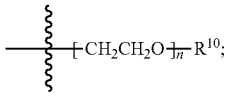

$R^{10}$ is H or methyl group (—CH$_3$); $R^5$ and $R^6$ are independent of each other (i.e., the substituents may be the same or different) and each is alkyl group, aryl group, alkoxy group, aryloxy group or OSiR$^{11}$R$^{12}$R$^{13}$, $R^{11}$, $R^{12}$ and $R^{13}$ are independent of each other (i.e., the substituents may be the same or different) and each is alkyl group, aryl group, alkoxy group or aryloxy group; a, c, and n are independent of each other (i.e., the values may be the same or different) and each is a positive number ranging from 0 to 3, and b is a positive number ranging from 0 to 8.

In certain embodiments, in the chemical skeletal formula represented by the formula (II-1) or formula (II-2), at least a hydroxyl group is a substituent of the main chain, at least an oxygen atom or a nitrogen atom or both thereof serves as a skeleton atom/skeleton atoms, and the siloxane monomer is an ionic monomer, a linear monomer or a branched monomer.

In certain embodiments, the hydrophilic monomer is at least one material selected from a group consisting of: N-vinyl pyrrolidone (NVP), 2-hydroxyethyl methacrylate (HEMA), 2-hydroxyethyl acrylamide (HEAA), glyceryl methacrylate (GMA), glycerol mono-meth acrylate (GMMA), meth-acrylic acid (MAA), acrylic acid (AA), N,N-di(methyl acrylamide) (DMA), N,N-di(methyl meth acryl-amide), N-vinyl-N-methyl acetamide, glycine vinyl carbonate, 2-methacryloyloxyethyl phosphorylcholine, and 2-hydroxy-butyl methacrylate. Based on the total weight of the contact lens material being 100 parts by weight, an amount of the hydrophilic monomer is between 40 parts by weight and 90 parts by weight.

In certain embodiments, the crosslinking agent is at least one material selected from a group consisting of: ethylene glycol di(methacrylate) (EGDMA), di(ethylene glycol) di(methacrylate) (DEGDMA), tri(ethylene glycol) di(meth-acrylate) (TEGDMA), tetra(ethylene glycol) di(methacry-late) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-triallyl-1,3,5-triazine-2,4,6(1H,3H,5H)-trione, 1,1,1-tri(methylolpropane) tri(methacrylate), tri(m-ethylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(a-crylate). Based on the total weight of the contact lens material being 100 parts by weight, an amount of the crosslinking agent is between 0.1 parts by weight and 5 parts by weight.

In certain embodiments, the initiator is at least one material selected from a group consisting of: bis(2,6-dif-luoro-3-(1-hydropyrro-1-yl)-phenyl) titanocene, phenyl bis-(2,4,6-trimethyl benzoyl)-phosphine oxide, 2-hydroxy-2-methyl-1-phenyl-1-propanone, 2,2'-Azodi(2,4-dimethylvaleronitrile) (ADVN), 2,2'-Azobis(2-methyl propionitrile) (AIBN), 2,2'-Azobis(2,4-dimethyl) valeroni-trile, 2,2'-Azobis(2methyl) propionitrile, 2,2'-Azobis(2-methyl) butyronitrile, and benzoyl peroxide. Based on the total weight of the contact lens material being 100 parts by weight, an amount of the initiator is between 0.01 parts by weight and 2 parts by weight.

In another aspect, the present disclosure provides a contact lens prepared from the above-mentioned contact lens material. The contact lens has a water content between 45 wt % and 80 wt %, an oxygen permeability not less than 40 barrers, an elastic modulus not greater than 1.5 MPa; a dynamic contact angle not greater than 80 degrees; and a lubricity between 5 and 10.

Therefore, the contact lens material of the present disclosure can be prepared into a silicone hydrogel contact lens, which has advantages of low cost, mass production, and simple manufacturing process. Furthermore, the contact lens prepared by the contact lens material of the present disclosure can have better surface properties, such as hydrophi-licity or wettability. Therefore, the surface of the contact lens may not require any additional hydrophilic coating. It is worth mentioning that, in the molecular structure of the siloxane monomer, the siloxane repeating units or the siloxy groups can increase the oxygen permeability (DK) of the contact lens. Furthermore, the first and second hydrophilic segments respectively in the main chain and the side chain can improve the surface hydrophilicity or wettability of the contact lens.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, compounds or the like, which are for distinguishing one component/compound from another one only, and are not intended to, nor should be construed to impose any substantive limitations on the components, signals or the like.

In the present disclosure, in order to describe a specific numerical range, the term "a numerical value to another numerical value" is used in the present disclosure, which should be interpreted as covering any value within the numerical range and a smaller numerical range defined by any value within the numerical range. The arbitrary numerical value and the smaller numerical range are clearly stated in the specification. In addition, for the sake of brevity, the structure of each polymer or group in the present disclosure is sometimes expressed in a skeletal formula, and carbon atoms, hydrogen atoms, and carbon-hydrogen bonds in the actual structure are omitted. However, when a specific atom or group of atoms is clearly depicted in the structural formula, the structural formula is based on the depicted one.

[Contact Lens Material]

An embodiment of the present disclosure provides a contact lens material. The contact lens material has characteristics of surface hydrophilicity, and the contact lens material can be used to form contact lenses with high oxygen permeability and high water content.

The contact lens material of the embodiment of the present disclosure includes: a siloxane monomer, a hydrophilic monomer, a crosslinking agent, and an initiator.

Based on a total weight of the contact lens material being 100 parts by weight, an amount of the siloxane monomer is preferably between 5 parts by weight and 50 parts by weight, and particularly preferably between 20 parts by weight and 40 parts by weight, but the present disclosure is not limited thereto.

A chemical empirical formula of the siloxane monomer is represented by formula (I):

$$C_aH_bO_cN_dSi_e \qquad \text{formula (I)}.$$

"C" represents carbon atoms, "a" represents the number of carbon atoms present in the siloxane monomer, and "a" is preferably a positive number between 12 and 55, and particularly preferably between 17 and 32.

"H" represents hydrogen atoms, "b" represents the number of hydrogen atoms present in the siloxane monomer, and "b" is preferably a positive number between 29 and 121, and particularly preferably between 38 and 71.

"O" represents oxygen atoms, "c" represents the number of oxygen atoms present in the siloxane monomer, and "c" is preferably a positive number between 4 and 17, and particularly preferably between 6 and 14.

"N" represents nitrogen atoms, "d" represents the number of nitrogen atoms present in the siloxane monomer, and "d" is preferably a positive number between 0 and 5, and is particularly preferably between 0 and 3.

"Si" represents silicon atoms, "e" represents the number of silicon atoms present in the siloxane monomer, and "e" is preferably a positive number between 1 and 9, and particularly preferably between 3 and 5.

In various embodiments of the present disclosure, a molecular weight of the siloxane monomer is preferably between 400 and 1,200, and particularly preferably between 500 and 700.

In various embodiments of the present disclosure, a main chain of a molecular structure of the siloxane monomer has siloxane repeating units or siloxy groups. The main chain further has a first hydrophilic segment composed of a 1-aminoglycerol structural fragment modified by a substituent represented by formula (I-a), and a branched chain of the molecular structure of the siloxane monomer further has a second hydrophilic segment composed of polyethylene glycol (PEG).

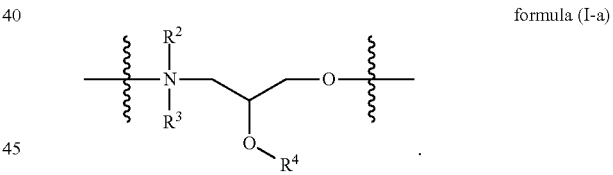

formula (I-a)

In various embodiments of the present disclosure, the molecular structure of the siloxane monomer further has a hydrophilic branch grafted onto the main chain. The hydrophilic branch has x carbon atoms and y oxygen atoms, in which $0 \leq x+y \leq 10$, and an end of the hydrophilic branch away from the main chain has a hydrophilic functional group, which is a hydroxyl functional group (—OH group) or an alkoxy functional group.

According to the above configuration, the contact lens material of the present disclosure can be prepared into a silicone hydrogel contact lens, which has advantages of low cost, mass production, and simple manufacturing process. Furthermore, the contact lens prepared by the contact lens material of the present disclosure can have better surface properties, such as hydrophilicity or wettability. Therefore, the surface of the contact lens may not require any additional hydrophilic coating. It is worth mentioning that, in the molecular structure of the siloxane monomer, the siloxane repeating units or the siloxy groups can increase the oxygen permeability (DK) of the contact lens. Furthermore, the first and second hydrophilic segments respectively in the main chain and the side chain can improve the surface hydrophilicity or wettability of the contact lens.

In various embodiments of the present disclosure, the chemical empirical formula of the siloxane monomer can be represented by formula (I-1), formula (I-2), or formula (I-3).

$C_{24}H_{53}O_9NSi_3$             formula (I-1).

$C_{28}H_{61}O_{11}NSi_3$            formula (I-2).

$C_{17}H_{38}O_6Si_3$               formula (I-3).

The siloxane monomer represented by the above formula (I-1) has a molecular weight of 583.9354. The siloxane monomer represented by the above formula (I-2) has a molecular weight of 672.0405. The siloxane monomer represented by the above formula (I-3) has a molecular weight of 422.7365.

In various embodiments of the present disclosure, the chemical empirical formula of the siloxane monomer represented by the formula (I) has a chemical skeletal formula represented by formula (II-1) or formula (II-2):

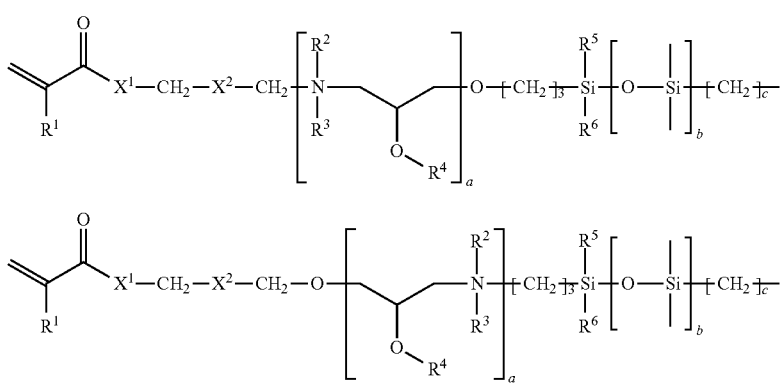

$R^1$ is H or methyl group (—$CH_3$); $X^1$ is O or $NR^8$; $X^2$ is CH—$OR^9$ or absent; $R^2$ is methyl group (—$CH_3$) or absent; $R^3$, $R^4$, $R^7$, $R^8$ and $R^9$ are independent of each other (i.e., the substituents may be the same or different) and each is H or methyl group (—$CH_3$) or

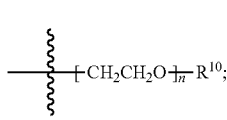

$R^{10}$ is H or methyl group (—$CH_3$); $R^5$ and $R^6$ are independent of each other (i.e., the substituents may be the same or different) and each is alkyl group, aryl group, alkoxy group, aryloxy group or $OSiR^{11}R^{12}R^{13}$, having 1 to 10 carbon atoms; $R^{11}$, $R^{12}$ and $R^{13}$ are independent of each other (i.e., the substituents may be the same or different) and each is alkyl group, aryl group, alkoxy group or aryloxy group, having 1 to 10 carbon atoms; a, c, and n are independent of each other (i.e., the values may be the same or different) and each is a positive number ranging from 0 to 3 (preferably ranging from 1 to 3), and b is a positive number ranging from 0 to 8 (preferably ranging from 1 to 8).

In the above chemical skeletal formula represented by the formula (II-1) or formula (II-2),

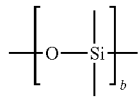

is the siloxane repeating units or the siloxy.

Further, the substituent

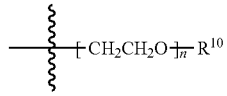

of $R^3$ or $R^7$ is the second hydrophilic segment composed of polyethylene glycol (PEG).

Further, $X^1$ and $X^2$ are backbone atoms or groups in the main chain, or hydrophilic segments.

Further, in the chemical skeletal formula represented by the formula (II-1) or formula (II-2), at least a hydroxyl group is a substituent of the main chain, at least an oxygen atom or a nitrogen atom or both thereof serves as a skeleton atom/skeleton atoms, and the siloxane monomer is an ionic monomer, a linear monomer or a branched monomer.

In a first specific embodiment of the present disclosure, the substituents of the siloxane monomer represented by the chemical empirical formula (I-1) corresponding to the chemical skeletal formula (II-1) are as follows: $R^1$=$CH_3$; $X^1$=O; $X^2$=CH—$OR^9$; a=c=1; b=0; $R^2$ none;

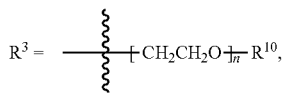

n=2; $R^4$=$R^7$=$R^9$=$R^{10}$=H; $R^5$=$R^6$=$OSir^{11}R^{12}R^{13}$, $R^{11}$=$R^{12}$=$R^{13}$=$CH_3$.

In a second specific embodiment of the present disclosure, the substituents of the siloxane monomer represented by the chemical empirical formula (I-2) corresponding to the chemical skeletal formula (II-1) are as follows: $R^1$=$R^5$=$R^6$=$CH_3$; $X^1$=O; $X^2$=CH—$OR^9$; a=c=1; b=2; $R^2$=none;

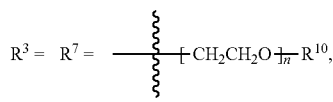
$R^3 = R^7 = -\!\!\!\!\!\!\{\!\!-(CH_2CH_2O)_{\overline{n}}R^{10},$ n=2; $R^4=R^9=R^{10}=H$.

In a third specific embodiment of the present disclosure, the substituents of the siloxane monomer represented by the chemical empirical formula (I-3) corresponding to the chemical skeletal formula (II-1) are as follows: $R^1=CH_3$; $X^1=O$; $X^2=CH-OR^9$; a=b=0; c=1; $R^5=R^6=OSiR^{11}R^{12}R^{13}$, $R^{11}=R^{12}=R^{13}=CH_3$; $R^7=R^9=H$.

In various embodiments of the present disclosure, the hydrophilic monomer is at least one material selected from a group consisting of: N-vinyl pyrrolidone (NVP), 2-hydroxyethyl methacrylate (HEMA), 2-hydroxyethyl acrylamide (HEAA), glyceryl methacrylate (GMA), glycerol monometh acrylate (GMMA), meth-acrylic acid (MAA), acrylic acid (AA), N,N-di(methyl acrylamide) (DMA), N,N-di (methyl meth acryl-amide), N-vinyl-N-methyl acetamide, glycine vinyl carbonate, 2-methacryloyloxyethyl phosphorylcholine, and 2-hydroxy-butyl methacrylate.

Furthermore, based on the total weight of the contact lens material being 100 parts by weight, an amount of the hydrophilic monomer is preferably between 40 parts by weight and 90 parts by weight, and particularly preferably between 45 parts by weight and 85 parts by weight, but the present disclosure is not limited thereto.

In various embodiments of the present disclosure, the crosslinking agent is at least one material selected from a group consisting of: ethylene glycol di(methacrylate) (EGDMA), di(ethylene glycol) di(methacrylate) (DEGDMA), tri(ethylene glycol) di(methacrylate) (TEGDMA), tetra(ethylene glycol) di(methacrylate) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-triallyl-1,3,5-triazine-2,4,6(1H,3H,5H)-trione, 1,1,1-tri(methylolpropane) tri(methacrylate), tri(methylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(acrylate).

Furthermore, based on the total weight of the contact lens material being 100 parts by weight, an amount of the crosslinking agent is preferably between 0.1 parts by weight and 5 parts by weight, and particularly preferably between 0.1 parts by weight and 3 parts by weight, but the present disclosure is not limited thereto.

In various embodiments of the present disclosure, the initiator is a photo-initiator.

In various embodiments of the present disclosure, the initiator is at least one material selected from a group consisting of: bis(2,6-difluoro-3-(1-hydroxypyrro-1-yl)-phenyl) titanocene, phenyl bis-(2,4,6-trimethyl benzoyl)-phosphine oxide, and 2-hydroxy-2-methyl-1-phenyl-1-propanone.

In various embodiments of the present disclosure, the initiator is at least one material selected from a group consisting of: 2,2'-Azodi(2,4-dimethylvaleronitrile) (ADVN), 2,2'-Azobis(2-methyl propionitrile) (AIBN), 2,2'-Azobis(2,4-dimethyl) valeronitrile, 2,2'-Azobis(2methyl) propionitrile, 2,2'-Azobis(2-methyl) butyronitrile, and benzoyl peroxide, but the present disclosure is not limited thereto.

Furthermore, based on the total weight of the contact lens material being 100 parts by weight, an amount of the initiator is preferably between 0.01 parts by weight and 2 parts by weight, and particularly preferably between 0.05 parts by weight and 1 part by weight, but the present disclosure is not limited thereto.

In order to improve the ultraviolet light blocking ability of the contact lens material, in various embodiments of the present disclosure, the contact lens material further includes an ultraviolet light blocking monomer. Based on the total weight of the contact lens material being 100 parts by weight, an amount of the ultraviolet light blocking monomer is between 0.30 parts by weight and 1.80 parts by weight. The ultraviolet light blocking monomer is at least one material selected from a group consisting of: a monomer having benzophenone and a monomer having benzotriazole.

In order to improve the solubility of the contact lens material, in various embodiments of the present disclosure, the contact lens material further includes a co-solvent. Based on the total weight of the contact lens material being 100 parts by weight, an amount of the co-solvent is between 3 parts by weight and 15 parts by weight. The co-solvent is at least one material selected from a group consisting of: glycerol, isopropyl alcohol, n-butanol, t-butanol, t-amyl alcohol, and n-hexanol.

In order to enable the contact lens material to have a specific color, in various embodiments of the present disclosure, the contact lens material further includes a dye material. Based on the total weight of the contact lens material being 100 parts by weight, an amount of the dye material is between 0.002 parts by weight and 0.050 parts by weight. The dye material is at least one material selected from a group consisting of: Reactive Blue 19 (disodium, 1-amino-9,10-dioxo-4-[3-(2-sulfonatooxyethylsulfonyl)anilino]anthracene-2-sulfonate), Sudan III (1-[4-(phenylazo)phenylazo]-2-naphthol), Indigo (2,2'-bis(2,3-dihydro-3-oxoindolylidene)), and Quinoline Yellow (disodium 2-(1,3-dioxo-2,3-dihydro-1H-inden-2-yl)quinolone-6,8-disulfonate).

[Method for Manufacturing Contact Lens]

An embodiment of the present disclosure further provides a method for manufacturing contact lenses. The method for manufacturing contact lenses includes: injecting the contact lens material into a mold for manufacturing contact lenses, and performing curing and molding processes on the contact lens material, thereby forming a semi-finished product of a dry contact lens. Then, the semi-finished product of the dry contact lens is immersed in a buffer solution until the semi-finished product of the dry contact lens swells (hydration procedure). Then, a buffer solution is filled in a packaging container, and then the contact lens is soaked in the buffer solution. A sealing procedure and a sterilization procedure are successively executed, thus completing the production of the contact lens product.

[Contact Lens]

An embodiment of the present disclosure further provides a contact lens. The contact lens is formed of the contact lens material of the above embodiment. According to the above-mentioned formulation of the contact lens material of the embodiment, the contact lens of the embodiment of the present disclosure can have high oxygen permeability, water content, and surface wetting characteristics.

The contact lens prepared by the contact lens material of the present disclosure can have better physical and chemical properties. More specifically, the contact lens of the present disclosure has: (a) a water content between 45 wt % and 80 wt %, and preferably between 65 wt % and 80 wt %; (b) an oxygen permeability of not less than 40 barrers, and preferably between 40 barrers and 60 barrers; (c) an elastic modulus not greater than 1.5 MPa, and preferably between 0.3 MPa and 0.6 MPa; (d) a dynamic contact angle not greater than 80 degrees, preferably not greater than 60 degrees, and particularly preferably not greater than 30 degrees; (e) a refractive index between 1.350 and 1.442; and (f) a lubricity between 5 and 10, and preferably between 6 and 9.

[Experimental Data and Test Results]

Hereinafter, the content of the present disclosure will be described in detail with reference to Exemplary Embodiments S1 to S11. However, the following embodiments are only to help understand the present disclosure, and the scope of the present disclosure is not limited to these examples.

The preparation methods of Exemplary Embodiments S1 to S11 include: injecting a contact lens material into a mold for manufacturing contact lenses, and performing a curing process and a molding process on the contact lens material, thereby forming a semi-finished product of a dry contact lens. Then, the semi-finished product of the dry contact lens was immersed in a buffer solution until the semi-finished product of the dry contact lens swells (hydration procedure). Then, a buffer solution was filled in a packaging container, and then the contact lens was soaked in the buffer solution. A sealing procedure with a sealing temperature of about 125° C. and a sterilization procedure with a sterilization time of about 30 minutes were successively executed, thus completing the production of the contact lens product.

The contact lens material mainly includes a siloxane monomer, a hydrophilic monomer, a crosslinking agent, and an initiator. The preparation methods of Exemplary Embodiments S1 to S11 were approximately the same. The differences were that the amounts of each component in the contact lens materials of Exemplary Embodiments S1 to S11 were different, and the siloxane monomers used in Exemplary Embodiments S1 to S11 were also different. Exemplary Examples S1 to S3 adopt the siloxane monomers having the above-mentioned chemical empirical formula (I-1) that corresponds to the first specific embodiment. Exemplary Examples S4 to S6 adopt the siloxane monomers having the above-mentioned chemical empirical formula (I-2) that corresponds to the second specific embodiment. Exemplary Examples S7 and S8 adopt the siloxane monomers having the above-mentioned chemical empirical formula (I-1) that corresponds to the first specific embodiment and the above-mentioned chemical empirical formula (I-2) that corresponds to the second specific embodiment. Exemplary Example S9 adopts the siloxane monomer having the above-mentioned chemical empirical formula (I-1) that corresponds to the first specific embodiment and the siloxane monomer having the above-mentioned chemical empirical formula (I-3) that corresponds to the third specific embodiment. Exemplary Example S10 adopts the siloxane monomer having the above-mentioned chemical empirical formula (I-2) that corresponds to the second specific embodiment and the siloxane monomer having the above-mentioned chemical empirical formula (I-3) that corresponds to the third specific embodiment. Exemplary Example S11 adopts the siloxane monomer having the above-mentioned chemical empirical formula (I-3) that corresponds to the third specific embodiment. The formulation compositions of Exemplary Examples S1 to S11 are shown in Table 1 below.

The siloxane monomers used in Exemplary Examples S1 to S11 have carbon atoms (C), hydrogen atoms (H), oxygen atoms (O), and silicon atoms (Si) in their chemical structure, but nitrogen atoms (N) are in different level. The siloxane monomer having the above-mentioned chemical empirical formula (I-3) that corresponds to the third specific embodiment does not have nitrogen atoms, which can be used as an experimental control group of different nitrogen, oxygen, and silicon compositions of the contact lens materials of the embodiments of the present disclosure.

The siloxane monomers used in Exemplary Embodiments S1 to S11 can all enable the contact lenses to have good physical and chemical properties, including: water content (wt %) of lens body, oxygen permeability of lens body (DK), elastic modulus (MPa) of lens body, dynamic contact angle of lens surface, and lubricity of lens surface. The test methods for the physical and chemical properties of contact lenses were described below, and the test results were shown in Table 5 below.

The method for measuring equilibrium water content (wt %) of lens body includes: measuring the weight of contact lens after moving water on a lens surface of the contact lens to obtain a hydrated lens weight; drying the contact lens in an oven; and measuring the weight of contact lens at dry state to obtain a dried lens weight. The hydrated lens weight minus the dried lens weight giving a weight difference. The equilibrium water content (wt %)=(the weight difference/the hydrated lens weight)×100.

The method for measuring oxygen permeability (DK) of lens body includes: using a polaro-graphic method described in ISO 9913-1 and using an $O_2$ permeo-meter instrument. Measurements were taken with the sample immersed in pure water equilibrated at least 12 hours, and then the oxygen permeability was measured by $O_2$ Permeometer Model 201T instrument (purchased from Rheder Development Company) at 35° C. in phosphate buffered saline. The oxygen permeability was recorded in the unit of Barrer.

The method for measuring tensile modulus (MPa) of lens body includes: using a tensile testing machine, Zwick Z0.5. Lens samples were cut into 2 mm in width. The thickness of the sample was measured prior to the start of the testing using a micrometer. The speed of movement of the extension of the sample, the length of the sample, and the distance between the clamping jaws at the start of the test were maintained constant. Each sample was placed in buffered saline during the measurement. The modulus was recorded in the unit of MPa.

The method for measuring dynamic contact angle (degree) of lens surface includes: using the captive bubble method. According to this method, a silicone hydrogel contact lens was properly clamped between two hard plastics such that the lens center portion was made relatively flat and then the lens was submerged into a small tank filled with borate buffered saline solution. Then, a bubble was properly introduced onto the lens surface and stayed on the surface. Picture was then taken with a digital camera, and then the left and right contact angles were obtained from drawing using a computer program, and the average of left and right contact angle was recorded.

The method for measuring lubricity of lens surface was scored blindly by 10 people (from 1 to 10). The higher the score was, the better the lubricity of the lens surface was.

TABLE 1

The formulations of the contact lens materials of Exemplary Embodiments S1 to S11. Among them, the total weight of the contact lens material is 100 parts by weight (PHR).

| Exemplary Embodiment | Siloxane monomer (PHR) | Hydrophilic monomer (PHR) | | | Crosslink agent (PHR) phenylbis(2,4,6-trimethylbenzoyl) phosphine oxide | Initiator (PHR) EGDMA |
|---|---|---|---|---|---|---|
| | | HEMA | DMA | NVP | | |
| S1 | 19.4 PHR of siloxane monomer with formula (I-1) | 20 | 20 | 40 | 0.2 | 0.4 |
| S2 | 29.4 PHR of siloxane monomer with formula (I-1) | 15 | 15 | 40 | 0.2 | 0.4 |
| S3 | 39.4 PHR of siloxane monomer with formula (I-1) | 10 | 10 | 40 | 0.2 | 0.4 |
| S4 | 19.4 PHR of siloxane monomer with formula (I-2) | 20 | 20 | 40 | 0.2 | 0.4 |
| S5 | 29.4 PHR of siloxane monomer with formula (I-2) | 15 | 15 | 40 | 0.2 | 0.4 |
| S6 | 39.4 PHR of siloxane monomer with formula (I-2) | 10 | 10 | 40 | 0.2 | 0.4 |
| S7 | 14.7 PHR of siloxane monomer with formula (I-1) 14.7 PHR of siloxane monomer with formula (I-2) | 15 | 15 | 40 | 0.2 | 0.4 |
| S8 | 19.7 PHR of siloxane monomer with formula (I-1) 19.7 PHR of siloxane monomer with formula (I-2) | 10 | 10 | 40 | 0.2 | 0.4 |
| S9 | 19.7 PHR of siloxane monomer with formula (I-1) 19.7 PHR of siloxane monomer with formula (I-3) | 10 | 10 | 40 | 0.2 | 0.4 |
| S10 | 19.7 PHR of siloxane monomer with formula (I-2) 19.7 PHR of siloxane monomer with formula (I-3) | 10 | 10 | 40 | 0.2 | 0.4 |
| S11 | 39.4 PHR of siloxane monomer with formula (I-3) | 10 | 10 | 40 | 0.2 | 0.4 |

TABLE 2

Test results of the physical and chemical properties of the contact lenses of Exemplary Embodiments S1 to S11.

| Exemplary Embodiment | physical and chemical properties of lens body | | |
|---|---|---|---|
| | water content (wt %) | oxygen permeability (DK) | elastic modulus (MPa) |
| S1 | 75 | 51 | 0.23 |
| S2 | 68 | 56 | 0.24 |
| S3 | 60 | 62 | 0.26 |
| S4 | 78 | 50 | 0.21 |
| S5 | 70 | 54 | 0.23 |
| S6 | 63 | 59 | 0.24 |
| S7 | 66 | 61 | 0.23 |
| S8 | 58 | 68 | 0.25 |
| S9 | 55 | 54 | 0.27 |
| S10 | 59 | 55 | 0.29 |
| S11 | 64 | 52 | 0.38 |

| Exemplary Embodiment | physical and chemical properties of lens surface | |
|---|---|---|
| | dynamic contact angle (degrees) | lubricity |
| S1 | 26.2 | 8.7 |
| S2 | 29.4 | 8.3 |
| S3 | 25.8 | 7.8 |
| S4 | 22.6 | 9.1 |
| S5 | 25.9 | 8.9 |
| S6 | 27.7 | 8.2 |
| S7 | 26.8 | 9.4 |
| S8 | 27.4 | 8.8 |
| S9 | 43.7 | 6.7 |
| S10 | 39.7 | 7.2 |
| S11 | 55.5 | 5.5 |

[Discussion of Experimental Results]

Table 2 shows the lens surface characteristics of Exemplary Embodiments S1 to S11, such as dynamic contact angle and lubricity. The lower the value of the dynamic contact angle is, the better the hydrophilicity of the lens surface is. Among many highly hydrophilic surfaces, the contact angle exhibits from 0 degrees to 30 degrees. The lubricity of the lens surface was blindly scored by 10 people (from 1 to 10). The higher the score is, the better the lubricity of the lens surface is. The test results of dynamic contact angle and lubricity are shown in Table 2, respectively.

The siloxane monomers used in Exemplary Embodiments S1 to S11 can all enable the contact lenses to have good physical and chemical properties. The contact lenses of Exemplary Embodiments S1 to S8 have better performance on hydrophilicity or wettability of the lens surface. Furthermore, in the chemical structures of the siloxane monomers of Exemplary Embodiments S1 to S8, oxygen atoms can be bonded with water molecules through hydrogen bonds to improve the surface hydrophilicity of the contact lens material. Nitrogen atoms in an ionic state are easily bonded to water molecules through hydrogen bonds.

In addition, the higher the content of silicon atoms is, the more hydrophobic the lens surface is. However, the siloxane monomers of Exemplary Embodiments S1 to S8 have more oxygen atoms and nitrogen atoms in the chemical structure, so that the lens surface of the contact lens can have good hydrophilicity and lubricity. Accordingly, the lens surface of each of the contact lenses made by the formulations of Exemplary Embodiments S1 to S8 may not need to be coated with any hydrophilic coating.

Beneficial Effects of the Embodiments

In conclusion, the contact lens material of the present disclosure can be prepared into a silicone hydrogel contact lens, which has advantages of low cost, mass production, and simple manufacturing process. Furthermore, the contact lens prepared by the contact lens material of the present disclosure can have better surface properties, such as hydrophilicity or wettability. Therefore, the surface of the contact lens may not require any additional hydrophilic coating. It is worth mentioning that, in the molecular structure of the siloxane monomer, the siloxane repeating units or the siloxy groups can increase the oxygen permeability (DK) of the contact lens. Furthermore, the first and second hydrophilic segments respectively in the main chain and the side chain can improve the surface hydrophilicity or wettability of the contact lens.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A contact lens material derived from:

a hydrophilic monomer;

a crosslinking agent;

an initiator; and a siloxane monomer, wherein, based on a total weight of the contact lens material being 100 parts by weight, an amount of the siloxane monomer is between 5 parts by weight and 50 parts by weight; and a chemical skeletal formula of the siloxane monomer is represented by formula (II-1) or formula (II-2):

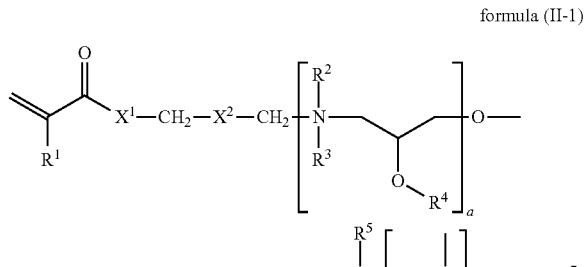

formula (II-1)

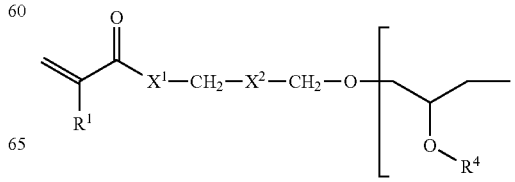

formula (II-2)

-continued

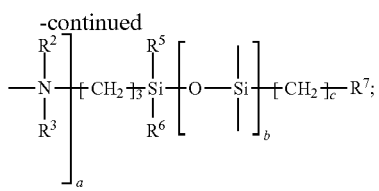

wherein R¹ is H or methyl group (—CH₃); X¹ is O or NR⁸; X² is CH—OR⁹ or absent;
wherein R² is methyl group (—CH₃) or absent; R³ is

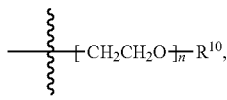

wherein R⁴, R⁷, R⁸ and R⁹ are independent of each other and each is H or methyl group (—CH₃) or

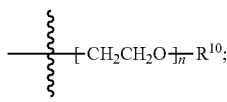

wherein $R^{10}$ is H or methyl group (—CH₃); $R^5$ and $R^6$ are independent of each other and each is alkyl group, aryl group, alkoxy group, aryloxy group or OSiR¹¹R¹²R¹³;
wherein R¹¹, R¹² and R¹³ are independent of each other and each is alkyl group, aryl group, alkoxy group or aryloxy group;
wherein a is a positive number ranging from 1 to 3,
wherein c is a positive number ranging from 0 to 3,
wherein n is a positive number ranging from 1 to 3, and
wherein b is a positive number ranging from 0 to 8.

2. The contact lens material according to claim 1, wherein a molecular weight of the siloxane monomer is between 400 and 1,200.

3. The contact lens material according to claim 1,
wherein the molecular structure of the siloxane monomer further has a hydrophilic branch grafted onto the main chain;
wherein the hydrophilic branch has x carbon atoms and y oxygen atoms, in which 0≤x+y≤10, and
wherein an end of the hydrophilic branch away from the main chain has a hydrophilic functional group, which is a hydroxyl functional group (—OH group) or an alkoxy functional group.

4. The contact lens material according to claim 1,
wherein, in the chemical skeletal formula represented by the formula (II-1) or formula (II-2), at least a hydroxyl group is a substituent of the main chain, and
wherein the siloxane monomer is an ionic monomer, a linear monomer or a branched monomer.

5. The contact lens material according to claim 1,
wherein the hydrophilic monomer is at least one material selected from the group consisting of: N-vinyl pyrrolidone (NVP), 2-hydroxyethyl methacrylate (HEMA), 2-hydroxyethyl acrylamide (HEAA), glyceryl methacrylate (GMA), glycerol mono-meth acrylate (GMMA), meth-acrylic acid (MAA), acrylic acid (AA), N,N-di(methyl acrylamide) (DMA), N,N-di(methyl meth acryl-amide), N-vinyl-N-methyl acetamide, glycine vinyl carbonate, 2-methacryloyloxyethyl phosphorylcholine, and 2-hydroxy-butyl methacrylate;
wherein, based on the total weight of the contact lens material being 100 parts by weight, an amount of the hydrophilic monomer is between 40 parts by weight and 90 parts by weight.

6. The contact lens material according to claim 1,
wherein the crosslinking agent is at least one material selected from the group consisting of: ethylene glycol di(methacrylate) (EGDMA), di(ethylene glycol) di(methacrylate) (DEGDMA), tri(ethylene glycol) di(methacrylate) (TEGDMA), tetra(ethylene glycol) di(methacrylate) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-triallyl-1,3,5-triazine-2,4,6(1H,3H,5H)-trione, 1,1,1-tri(methylolpropane) tri(methacrylate), tri(methylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(acrylate);
wherein, based on the total weight of the contact lens material being 100 parts by weight, an amount of the crosslinking agent is between 0.1 parts by weight and 5 parts by weight.

7. The contact lens material according to claim 1,
wherein the initiator is at least one material selected from the group consisting of:
bis(2,6-difluoro-3-(1-hydropyrro-1-yl)-phenyl) titanocene, phenyl bis-(2,4,6-trimethyl benzoyl)-phosphine oxide, 2-hydroxy-2-methyl-1-phenyl-1-propanone, 2,2'-azodi(2,4-dimethylvaleronitrile) (ADVN), 2,2'-azobis(2-methyl propionitrile) (AIBN), 2,2'-azobis(2,4-dimethyl) valeronitrile, 2,2'-azobis(2methyl) propionitrile, 2,2'-azobis(2-methyl) butyronitrile, and benzoyl peroxide;
wherein, based on the total weight of the contact lens material being 100 parts by weight, an amount of the initiator is between 0.01 parts by weight and 2 parts by weight.

8. A contact lens prepared from the contact lens material according to claim 1, characterized in that the contact lens has a water content between 45 wt % and 80 wt %, an oxygen permeability not less than 40 barrers, an elastic modulus not greater than 1.5 MPa,
wherein a dynamic contact angle not greater than 80 degrees; and a lubricity between 5 and 10.

* * * * *